United States Patent [19]

Witte et al.

[11] Patent Number: 5,655,120
[45] Date of Patent: Aug. 5, 1997

[54] METHOD FOR LOAD BALANCING IN A MULTI-PROCESSOR SYSTEM WHERE ARISING JOBS ARE PROCESSED BY A PLURALITY OF PROCESSORS UNDER REAL-TIME CONDITIONS

[75] Inventors: Martin Witte, Ulm; Joerg Oehlerich, Stockdorf; Walter Held, Geretsried, all of Germany

[73] Assignee: Siemens Aktiengesellschaft, Munich, Germany

[21] Appl. No.: 743,673

[22] Filed: Nov. 6, 1996

Related U.S. Application Data

[63] Continuation of Ser. No. 312,303, Sep. 26, 1994, abandoned.

[30] Foreign Application Priority Data

Sep. 24, 1993 [EP] European Pat. Off. ............ 93115467

[51] Int. Cl.$^6$ ................................................ G06F 15/16
[52] U.S. Cl. ................ 395/675; 379/309; 379/113; 395/200.53
[58] Field of Search ............................ 395/675; 379/309

[56] References Cited

U.S. PATENT DOCUMENTS

| | | | |
|---|---|---|---|
| 4,099,235 | 7/1978 | Hoschler | 395/650 |
| 4,403,286 | 9/1983 | Fry et al. | 364/200 |
| 4,495,562 | 1/1985 | Yamasi et al. | 395/550 |
| 4,495,570 | 1/1985 | Kitajima et al. | 364/200 |
| 4,633,387 | 12/1986 | Hartung et al. | 395/650 |
| 4,748,558 | 5/1988 | Hirosawa et al. | 364/200 |
| 4,839,798 | 6/1989 | Eguchi et al. | 395/650 |
| 4,858,120 | 8/1989 | Samuelson | 364/401 |
| 4,954,945 | 9/1990 | Inoue | 395/650 |
| 4,974,256 | 11/1990 | Cyr et al. | 379/113 |
| 5,031,089 | 7/1991 | Liu et al. | 364/200 |
| 5,155,851 | 10/1992 | Krishnan | 395/650 |
| 5,212,793 | 5/1993 | Donica et al. | 395/700 |
| 5,381,546 | 1/1995 | Servi et al. | 395/650 |
| 5,504,894 | 4/1996 | Ferguson et al. | 395/650 |

OTHER PUBLICATIONS

Software Practice & Experience, No. 5, May, 1989, "Sahayog: A Test Bed For Evaluating Dynamic Load-Sharing Policies", by Dikshit et al, pp. 411–435.

IEEE Transactions on Computers, vol. 38, No. 8, Aug., 1989, "Load Sharing in Distributed Real-Time Systems with State-Change Broadcasts", Shin et al, pp. 1124–1142.

IEEE Computer Society —The 12th International Conference on Distributed Computing Systems, Jun. 9–12, 1992, "An All-Sharing Load Balancing Protocol in Distributed Systems on the CSMA/CD Local Area Network", by Kim et al, pp. 82–89.

Proceedings of the Eleventh International Teletraffic Congress, Sep. 4–11, 1985 —"An Overload Control Strategy for Distributed Control Systems", by M. Villen-Altamirano et al, pp. 835–841.

Hac et al, Dynamic Load Balancing In a Distributed System Using a Sender–Initialed Algorithm, Local Computer Networks, 1988 13th Conf. pp. 172–180.

Ryou et al, A Task Migration Algorithm for Load Balancing in a Distributed System, System Sciences, 1989 Wtl. Conf. vol. II, pp. 1041–1048.

*Primary Examiner*—Kevin A. Kriess
*Assistant Examiner*—Lucien Toplu
*Attorney, Agent, or Firm*—Hill, Steadman & Simpson

[57] ABSTRACT

Method for load handling in a multiprocessor system, particularly a multiprocessor system of a communication system, whereby arising jobs can be processed by a plurality of processors under real-time conditions. When individual processors proceed into overload due to locally heavy load situations, then a discharge of the local overload is achieved in that further requests arriving at the processor in this load situation are forwarded insofar as possible or necessary to other processors that are not overloaded.

11 Claims, 3 Drawing Sheets

METHOD FOR LOAD BALANCING IN A MULTI-PROCESSOR SYSTEM WHERE ARISING JOBS ARE PROCESSED BY A PLURALITY OF PROCESSORS UNDER REAL-TIME CONDITIONS

This is a continuation of application Ser. No. 08/312,303, filed Sep. 26, 1994, now abandoned.

BACKGROUND OF THE INVENTION

The invention is directed to a method for load balancing in a multi-processor system wherein arising jobs can be processed by a plurality of processors under real-time conditions.

When the multi-processor system is a matter of a processor-controlled communication system, the communication system is dimensioned on the basis of a predicted call processing volume and/or minimum demands to be observed such as, for example, those made of the call setup times (through-connection delay). A critical parameter that defines the dimensioning of a switching system is prescribed with the anticipated traffic flow. This traffic flow thereby derives from the quotient that is calculated from the sum of the occupancy duration—referred to the occupations in an observation interval. The processor-controlled communication system dimensioned according to the traditional traffic expectations, however, must also be capable to the farthest-reaching degree of processing all incoming switching inquiries given occurring peak loads that arise on specific days, at individual times of the day, or for handling unpredictable events, for example given the assistance of load balancing methods.

SUMMARY OF THE INVENTION

An object of the invention is to specify a load balancing method for a real-time system that guarantees that optimally few processor requests are rejected, even in heavy load situations.

According to the invention, a method is provided for load balancing in a multi-processor system, and particularly a multi-processor system of a communication system where arising jobs can be processed by a plurality of processors under real-time conditions. Each processor calculates its load state in the form of a quantified quantity. Each processor is informed of the load states of the other processors within a time grid. Dependent on the upward crossing of the specific size of its load state and dependent on the load states of the other processors, each processor transfers at least a part of the jobs arising at it to the other processors. The transferred jobs are distributed onto the other processors in conformity with the load states of the other processors.

The invention yields the advantages that, due to considering load conditions of processors, the overload of individual processors is distributed onto processors that are not overloaded. Thus, the distributed jobs cause no additional load fluctuations within the meshed processors and the observation of the through-connection delays is thereby not influenced.

In addition to yielding the advantage that the processors in an "underload" situation are protected against overload by distributed jobs, the invention also yields the further advantage that the work load of the processor is based on its "heavy load threshold."

One development of the invention is that the characteristic load values are given a hysteresis value, this yielding the advantage that overshoots upon entry into the overload case are avoided.

A further development of the invention is that additional jobs are also processed by a processor whose load condition is classified as being "high"; this yields the advantage that the plurality of foreign jobs assigned per processor is based on the free capacity of this processor that is available.

One development of the invention is that the portion of jobs to be distributed away from a processor in an overload condition is calculated from the characteristic load number.

A development of the invention is that the distributed load is added in estimated fashion to the load being handled by a processor itself. This yields the advantage that the overload situation of a processor is considered ended only when the estimated load actually pending at the processor drops below a heavy load threshold and a switching-oriented overload classification is set to zero and a safety margin has been observed.

DESCRIPTION OF THE PREFERRED EMBODIMENTS

Figure 1:
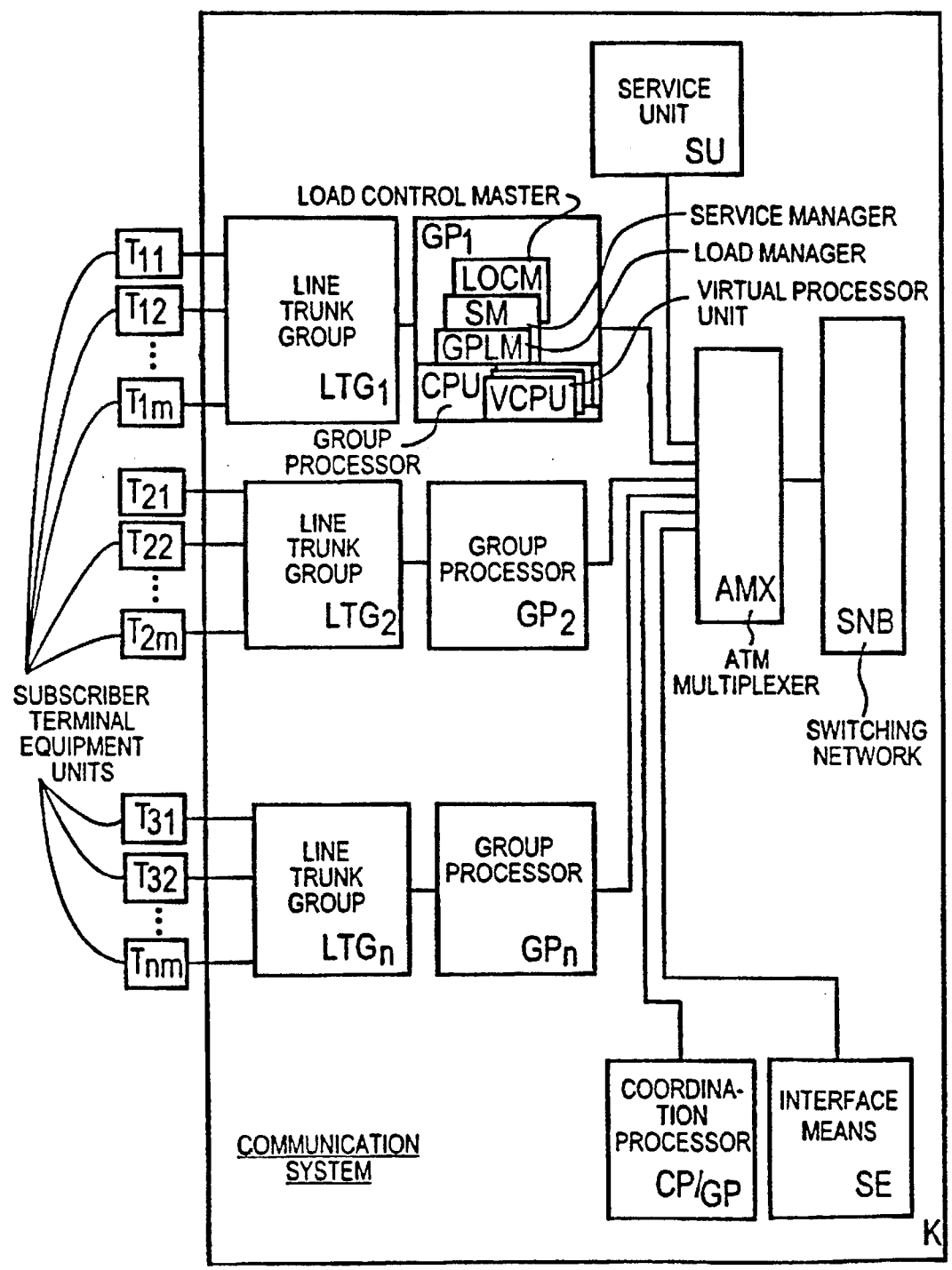
FIG. 1 illustrates in block diagram format a part of a communication system.
Figure 2:
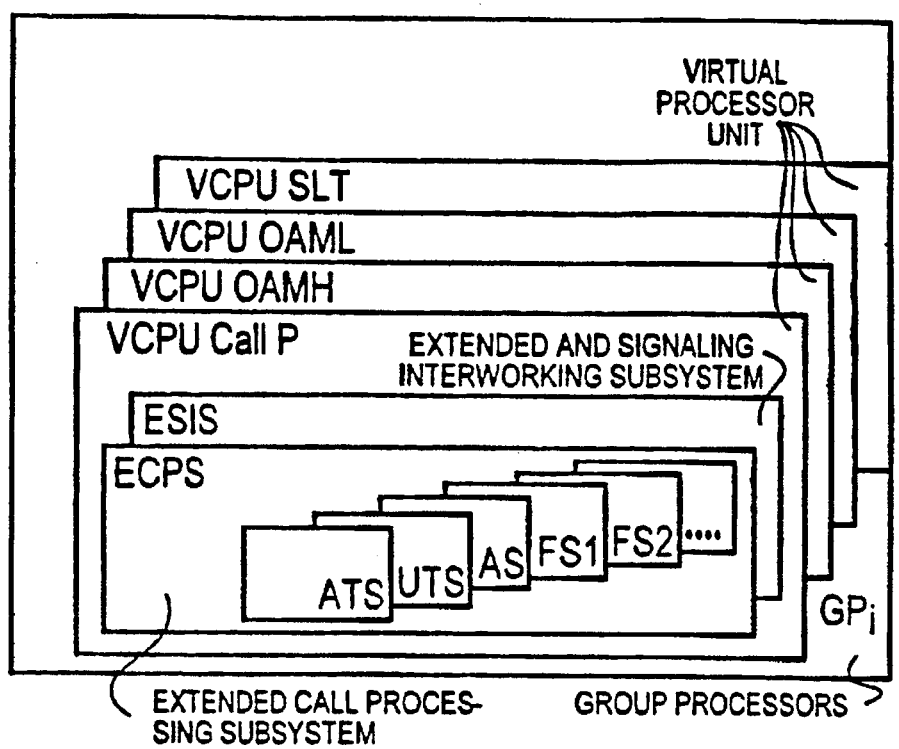
FIG. 2 shows process handling units of a group processor belonging to the communication system.

FIG. 2 shows components of a communication system K with a scope necessary for an understanding of the invention. These components are subscriber terminal equipment units Tn1, ... Tnm, line trunk groups LTG1, ... LTGn for the connection of the subscriber lines to be connected to the subscriber terminal equipment, a group GPn, a coordination processor CP or a further group processor GP assuming the functions of a coordination processor, an interface means SE to further switching systems, a service unit SU, a multiplexer AMX operating in the asynchronous transfer mode, as well as a switching network SNB that through-connects connecting routes to desired subscriber terminal equipment with an asynchronous transfer mode ATM. The line trunk groups LTGn each combine a respective number of subscriber terminal equipment units. Switching-oriented jobs that arise in the line trunk groups LTGn are respectively handled by at least one group processor GPi. The group processors GPn employed in a communication system K are thus all structured essentially identically. The group processors GPn have access via the multiplexer AMX to further-processing units of the communication system K. In addition to the group processors GPn, the service unit SU, the switching network SNB as well as further processors such as, for example, a coordination processor CP, are connected to this multiplexer AMX. Among other things, access to other switching systems exists via the asynchronous transfer mode multiplexer AMX.

The group processors GPn are mainly responsible for the call setup and call cleardown. For executing such switching-oriented jobs, they also have characteristics about the specific configurations of the line trunk groups LTGn connected to them. The data exchange between the group processors GPn occurs via the multiplexer AMX.

FIG. 2 shows some system components of the group processor GPi that are critical to the invention. The group processor GPi is internally subdivided into a plurality of virtual processor units VCPUs that are respectively responsible for different jobs. The allocation of the calculating time of "central processor unit" CPU to the respective microprocessor unit VCPUs occurs via a specific allocation procedure (scheduling).

In conjunction with the invention, the virtual processor unit VCPU-CallP is of special interest, since it is responsible for the switching of the telephone connections. The virtual processor unit VCPU-CallP is internally composed of a plurality of processes.

By way of example, let a few processors as well as their jobs be recited here:

ESIS: Extended signaling and interworking subsystem;

The EWSX signaling and interworking subsystem ESIS forms the interface between the various subscriber terminal equipment Tn1, . . . Tnm allocated to the line trunk groups LTGn and implements the matching between external signaling systems and the internal message interface;

ECPS: Extended call processing subsystem—This subsystem is responsible for the processing of the call routing, call setups, call cleardown as well as specific or special features. Specific services such as that of ATS (access transaction segment), UTS (user transaction segment), AS (associator segment) . . . can be accessed for handling these processes.

These processes communicate to one another via what are referred to as messages. A plurality of messages are thereby sent between the individual processes per call connection, a procedure triggered by a substructure terminal equipment Tnm for call setup. This message traffic composed on a case-by-case basis of far more than 100 message procedures sequences at a single group processor GPi per call. When a call is distributed, the messages between the process ESIS, which is located on the "home group processor" GPj and the ECPS processes as well as further switching-oriented processes run via the ATM network to a group processor GPx that can still be "loaded."

Figure 3:
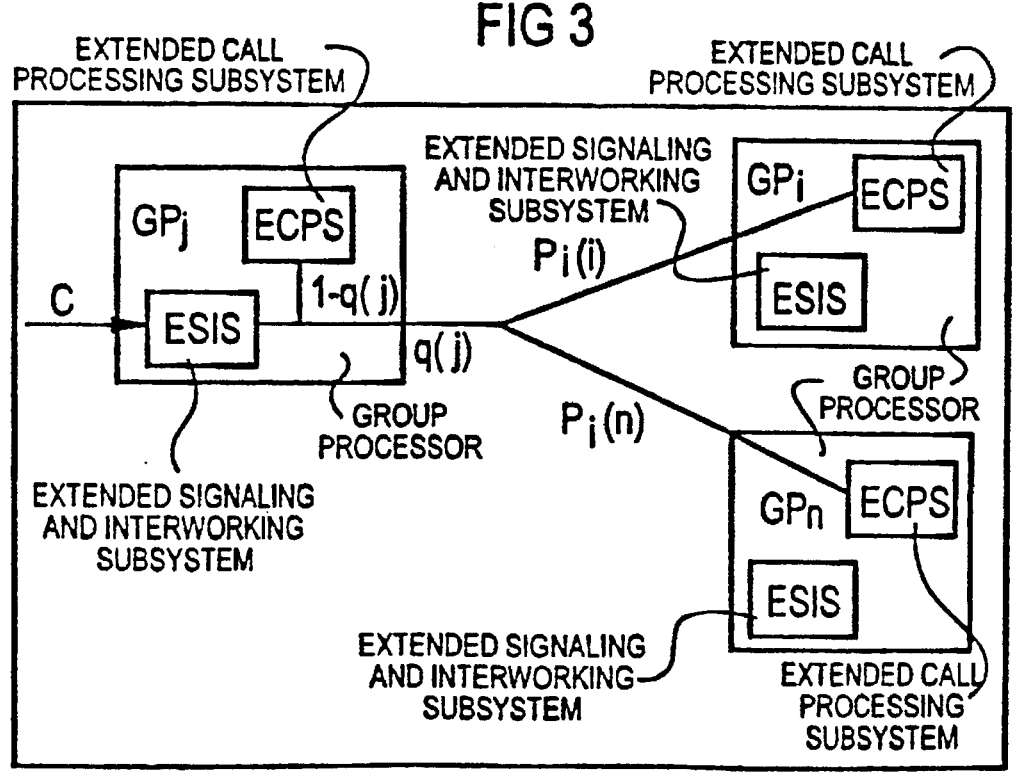
FIG. 3 is a diagram of the method of the invention.

FIG. 3 schematically shows a distribution pattern that forwards calls C pending at the group processors GPj to group processors GPx that can still be "loaded."

A load manager GPLM implemented in the group processor GPn that is respectively assigned a processor time for processing its jobs by the virtual processor unit operation and maintenance (high priority) VCPU-OAMH calculates the momentary load state (group processor load state) GPLS of the group processor as well as a value OPL (overload priority level) that indicates a specified switching-oriented overload defense stage. This specific switching-oriented overload protection level OPL is respectively calculated in the load state—"overload"—of the group processor. Following load states—normal, high, overload and extreme—of the group processor GPn are calculated by the load manager GPLM corresponding to the load of the central processor unit CPU of the group processor. The individual load states GPLS of the group processor GPx are thereby characterized, for example, as follows: GPLS-normal:

The load of the group processor is below the normal load threshold defined for it. For example, the normal load threshold lies at 0.71 Erlang (Erlang is the unit of the traffic flow, wherein 0.71 Erlang corresponds to a 71% load of the group processor). GPLS-high:

The group processor is in high load, i.e. above its normal load threshold. In this state, overload defensive measures are not yet initiated for the group processor. GPLS-overload:

The group processor is in overload. Jobs that should be handled by the group processor are thus temporarily transferred—insofar as possible—to group processors GPn that are not overloaded. The overload threshold lies, for example, at >0.8 Erlang.

In addition to calculating the load states GPLS, the manager GPLM implemented on the group processor GPn is also responsible for identifying the switching-oriented overload priority levels during the overload of the group processor GPn. The switching-oriented overload priority levels OPLn are a criterion for the intensity of the overload defense that can be implemented by the switching-oriented processors and the periphery belonging thereto while the group processor GPn is in overload. The switching oriented overload priority levels OPS are thereby preferably subdivided into levels between 0 and 6:

OPL 0 denotes no defense; at

OPL 1 approximately 16% of all newly arriving cells are rejected; and

OPL 6 only calls that arrive from another communication system via prioritized trunk lines are still accepted.

The load states GPLS of the group processor GPn recited here as well as the switching-oriented overload priority levels OPLn can be made finer or rounded off as desired in accordance with the dimensioning of the communication system K.

When a group processor GPi is not in the "overload" load state, no call is further-distributed. When, however, a group processor is in the load state "overload," then a portion of the newly arriving calls that are to be forwarded for further processing to free group processor GPx is defined on the basis of a value q that fluctuates between 0 and 1. On the basis of another value p that can be calculated, and which reflects the acceptance capability of the remaining group processors for further calls, a determination is made as to whether distribution can be carried out at all on the basis of the overall load of these group processors GPn of the communication system K. When it is decided that a call is to be distributed, what "destination group processors" GPx should be offered for processing the ECPS procedures is defined corresponding to the calculated values p of the group processors.

The values q and p are locally calculated by each group processor GPn from the loac states GPLS and from its own load value a. A pseudocode for calculating the values p and q is recited below.

```
PROCEDURE calc q;
! calculate q;
BEGIN
    IF q=0
    THEN q:min (1, free GPS/overloaded GPS-0.1));
    IF myOLC.GPLS<2
    THEN BEGIN ! GP not overloaded;
    IF q<freeGPs/(overloaded: GPs+0.01) ! q too small;
    THEN q:=MIN (1,free GPs/(overloaded GPs+0.01))
    ELSE q: =MIN (q*p sum, 1);
    !no distr.ness., slowly increase q
    END
    ELSE BEGIN !GP is overloaded
    IF p sum >1 [too much distributed;
    THEN BEGIN
        q:=q*p sum;
        damping:=damping+1;
    END
    ELSE BEGIN !more distribution possible;
    IF (myOLC.OfferedLoad>0,95 OR
    myOLC.OPL>O) AND dapming>2
    THEN BEGIN
        q:=MIN(q*1.2,1);
        damping:=0;
    END
        ELSE damping: =damping+1;
        IF myOLC.offeredLoad<0.65 AND myOLC.POL=0
        THEN BEGIN
```

```
        q:=MAX (0,q/1.1);
        damping: =damping+1;
        END;
    END;
END GP is overloaded;
END PROCEDURE calc q;
END CLASS smartGPL TAB;
PROCEDURE calc p;
! calculate p(i);
BEGIN
    INTEGER i;
    REAL alpha; !Initialization. for p;
    alpha: =1/(4*(freeGPS +0.1));
    p_sum:=0;
    FOR i:=1 STEP 1 UNTIL NumberOfGPs DO BEGIN
        IF the GPL TAB(I) =0
        THEN BEGIN
            IF p(I)=0 THEN p(i):=alpha ELSE p(1):=p(i)*1.05;
        END;
        IF the GPL TAB(i)=1
        THEN p(i):=max(0,p(i)*0.9);
        IF the GPL TAB(i) >1
        THEN p(i): =0;
        p sum: =p sum +p(i);
    END
    IF p sum>0 THEN BEGIN Inormalize p0;
        FOR j:=1 STEP 1 UNTIL NumberOfGPs DO
            P(j): =p(j)/p sum;
    END
END PROCEDURE calc p;
```

Figure 4:
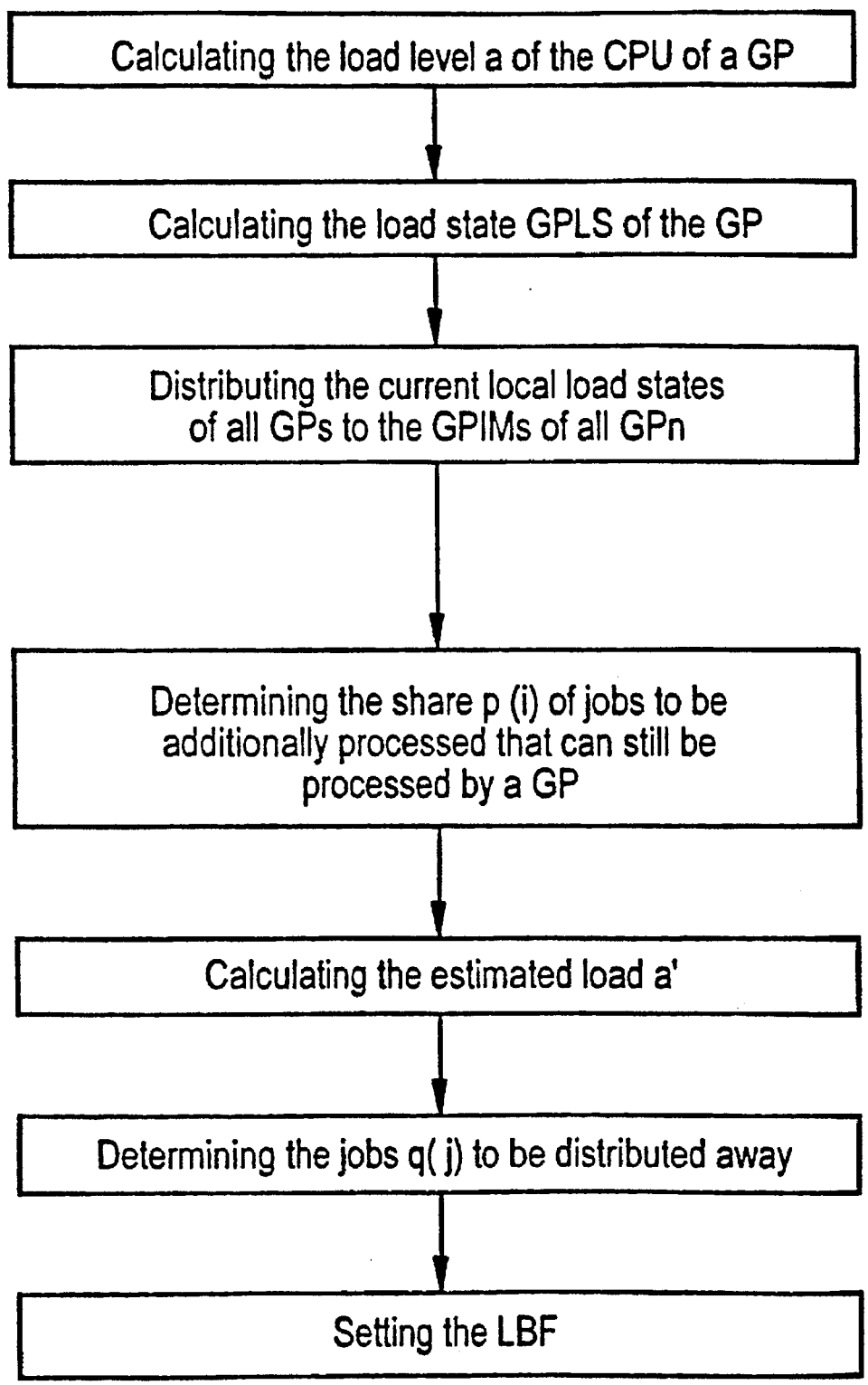
FIG. 4 shows a flow chart for explaining the invention.

FIG. 4 shows a flow chart wherein the individual program procedures are indicated that are called in and processed for handling, for example, locally occurring overloads at a group processor GPj.

The calculation of the values pi(n), qj recited in the distribution pattern of FIG. 3 as well as of the load state GPLSj occurs, as already mentioned above, in the program module load manager GPLM of the group processor GPj. The GPLM is a process that is handled by the virtual processor unit VCPU-OAMH.

The steps shown in the flow chart shall be described below:
Calculation of the load value a:
The load value a is calculated from the load of the central processor unit of the respective group processor.
Calculation of the load state GPLS of a group processor GPs:

For calculating the load state GPLS, an integrating start indicator S that recognizes a lasting overload situation in the fashion of an "estimator", a load balancing flag LBF as well as a hysteresia width that, for example, can have the value 0.1 allocated to it, are employed.

The calculation of the quantified quantities GPLS is implemented according to the following pseudocode:

```
a) Previous GPLS "Normal"
if a > normal load threshold + x
then GP LS:= "high";
if S > Thresh and a > high load threshold + x
then GPLS:= "overload";
b) Previous GPLS "high"
if a < normal load threshold
then GPLS:= "normal"
if S > Thresh and a > high load threshold + x
then GPLS := "overload";
c) Previous GPLS "overload"
if LBF = true
then a':=a/(1-q(j)d)
else a':=a;
if a' > high load threshold or POL > 0
then begin
    GPLS:="overlast";
    real overlase;=true;
    if (OPL = 6 since 3s)
    Then GPLS:= "extrem"
end
else begin (There is no longer a true overload from this point)
if no rejection since 6s
then begin
    if a' < high load threshold
    then begin
        GPLS:= "high"
        if a' < normal load threshold
        then GPLS:= "normal"
    end;
end
else begin
    GPLS:= "overload";
    real overload:= false;
end;
end;
d) previous GPLS ="extrem"
```

No new load traffic is now accepted by the own line trunk groups LTGs.

The program procedure "determining GPLS" is essentially defined from the load value a of the processor of the most recent second. If distribution is already being carried out, a calculation is carried out via the quantity a that expresses the load actually pending at the group processor. The load value a represents an estimator for the anticipated load for the central processing unit CPU of the next monitoring interval.

Informing the load manager on all GPn about the load states of all GPn.

Two possibilities of information distribution come into consideration therefor:
a) All GPLMs send their local load information (GPLS, OPL) to a centralized process called load control master (LOCM) on a specifically defined processor GPx. The LOCM collects the load information and transmits the collected information to all GPLM s in the system as quickly as possible.
b) On the basis of an "each-informs-each" communication between the GPLMs, each GPLM distributes its local load information (GPLS, OPL) to the GPLM of all other GPn in the system.

After a brief time interval of intermediate storage of all GPLS, these are distributed to all GPn and are respectively entered in a table thereat. After a brief time interval, updated GPLS of each group processor GPx are available for entry into a group processor table.

Determination of the jobs p(i) to be additionally handled:
The value p(i) is thereby the proportion of calls C distributed away from the "home group processors", these calls C to be processed at a free group processor GP(j). The value p(i) is thereby identified according to the following strategy:
a) GPLS(i)="normal" p(i) can be raised since processing capacity on GP(i) can still be utilized.
b) GPLS(i)="high"p(i) is lowered since GP(i) has too much load.
c) GPLS(i)="overload" p(i) is set to zero since GP(i) is in an overload operating state.

The resetting of the values p(i) departs on the basis of an average distribution proportion per free group processor GP(i). As long as a GP(i) is in the load state of "overload", p(i)=0 applies. When the load state changes from "overload" into "normal" or "high", then the value p(i):=1/(C*(plurality of free GP(x)) is defined. C is a parameter into which the switching-associated considerations relating to avoiding an overshooting of the load distribution system in the transient period enters.

Determination of the jobs q(i) to be distributed away

Before the value q(j), which indicates the proportion of calls to be distributed away when a group processor is in the overload state, a determination is made on the basis of p(i) as to whether a distribution can be carried out at all. When the sum of the p(n) not yet normed is a value that is greater than 1, then the value q(j) is determined according to the requirements of the respective GP(j). A determination is made on the basis of the load value a' whether q(j) is to be raised or lowered. When the GP(j) is not in the "overload" state, an attempt is always made to raise q(j).

a) When the switching-oriented overload priority level is OPL>0 or the load value a>0.8+x (with x=0.1) applies, q(j) is raised.
b) When GPLS(j)="overload" and OPL=0 and load value a <0.8−x apply, q(j) is lowered.
c) When GPLS(i)<"overload" [applies], raise q(i) the determination of the value q(j) in case c) refers to entry into the load distribution.

Normally, q(j)=1 should apply in order to receive a maximum distribution given a sudden overload. When the communication system K operates at its performance limit, q(j) must be lower so that the load distribution is not jeopardized by the entry of additional group processors GPx in overload. For this reason, q(j) is lowered when the sum of the individual p(n) is less than one.

In order to avoid possible oscillations of the overload method, it is advantageous when a short time interval is allowed to pass before a lowering of the value q(j). After it has been found that the group processor GP(j) would like to distribute calls, the load balancing flag LBF is set to "true"; if not, the LBF is set to "false". In a protective interval referred to as a guard period, the load balancing flag LBF is set to: =false, even though the group processor GP(j) can be in the "overload" load state.

Given a resetting of the value q(j), the following algorithm is applied:. When q(j)=0, q(j) becomes q(j): =min (1,(plurality of free GPx/plurality of the GPs that are in the "overload" load state)). When the GPLS of GP(j) is not in "overload" and q(j) <(plurality of free GPs/plurality of GPs in "overload") applies, then q(j) is set to q(j): =min (1, plurality of free GPs/plurality of GPs in "overload"). When the GP(j) is not in overload, q(j)=1 normally applies in order to assure a fast entry into the load distribution in case the GP(j) suddenly proceeds into overload. When, however, there are more GPs in overload than GPs for accepting external overload, q(j) is selected suitably lower in order to protect the GPs that are not overloaded against overload and to thus not jeopardize the system of load distributing.

The distributing of calls occurs as recited below: When a call pends, the service manager SM, which represents a direct interface to the calls to be handled and undertakes the actual distributing of the calls, determines on the basis of the LBF whether distribution is to be carried out or not. When the distribution is to be carried out, a check is made to see whether it is possible to distribute the pending call. If the distribution is fundamentally possible and desired, a decision is made as to whether this specific call is to be distributed. For that purpose, the quotient of the calls previously distributed in the time interval is formed with the plurality of all incoming calls and is compared to q(j). When the quotient is greater than q(j), the call is distributed. When, for example, the plurality of previously received calls is 20, that of previously distributed calls is 4, and the value of q(i) is q(i)=0.25, then it follows from the quotient 4/20 that this is smaller than q(j). The call is distributed in this case. When the call is to be distributed, a decision is made analogously thereto with reference to the values of p(j) as to which group processor GPx will assume the handling of the call.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for lead balancing in a multi-processor system of a communication system, comprising the steps of:
   processing arising jobs by a plurality of processors under real-time conditions;
   calculating with each processor a load state thereof so as to evaluate an actual load state by direct recognition of a processing time being given to each processor in order to deal with tasks of the respective processor;
   informing each of all of the plurality of processors of the load states of all of the other processors within a time grid;
   dependent on an upward crossing of a specific value of a load state of a particular processor and dependent on the load states of the other processors, transferring from the particular processor at least a part of the jobs arising at it to the other processors;
   determining a value indicative of a number of the jobs to be distributed away to the other processors, and making a decision as to whether a specific pending job is to be distributed by forming a quotient of jobs previously distributed in a time interval with a plurality of all incoming jobs, comparing that quotient to said value indicative of the number of jobs to be distributed away, and when the quotient is greater than the value indicating the number of jobs to be distributed away, the specific pending job is distributed;
   distributing the transferred jobs onto the other processors in conformity with the load states of said other processors; and
   transferring from said particular processor only so many jobs until the load state of said particular processor again falls below said specific value.

2. A method according to claim 1 including the step of defining the load state of each processor as a quantified value.

3. A method according to claim 2 including the step of providing said quantified value defining said load states with a hysteresis value for avoiding overshoots upon entry into overload defined by said crossing of said specific value.

4. A method according to claim 1 including the step of informing each processor of the load states of the other processors with an "each-informs-each" communication from individual control managers of the respective processors to all other control managers of the other processors in the communication system.

5. A method according to claim 1 including the step of utilizing a load control manager in each processor to receive and process the load states sent to the particular processor from the other processors.

6. A method according to claim 5 including the step of storing in the particular processor in tables corresponding to said time grid the load states received from the other processors.

7. A method according to claim 1 including the step of determining which processors are to receive the transfer jobs from the particular processor dependent on the respective load states of the other processors.

8. A method according to claim 1 including the step of raising or lowering a number of jobs which are transferred from said particular processor dependent on the respective load states of the other processors.

9. A method according to claim 1 including the step of determining how many jobs are to be transferred away from said particular processor in case of an overload based on an aggregate result from numbers of jobs which can be additionally assumed by the other processors.

10. A method according to claim 1 wherein one of the group of processors is a specifically defined processor which has a centralized load control master, and wherein the said load control master collects the load states of the other processors and then transmits collected information to all processors.

11. A method for load balancing in a multi-processor system of a communication system which is receiving calls, comprising the steps of:

calculating with each processor a load state thereof so as to evaluate an actual load state by direct recognition of a processing time being given to each processor in order to deal with tasks of the respective processor;

informing each of all of the plurality of processors of the load states of all of the other processors;

dependent on an upward crossing of a specific value of a load state of a particular processor and dependent on the load states of the other processors, transferring from the particular processor at least a part of the calls arising at it to the other processors;

determining a value indicative of a number of the calls to be distributed away to the other processors, and making a decision as to whether a specific pending call is to be distributed by forming a quotient of calls previously distributed in a time interval with a plurality of all incoming calls, comparing that quotient to said value indicative of the number of calls to be distributed away, and based on the comparison, deciding whether the specific pending call is distributed;

distributing the transferred jobs onto the other processors in conformity with the load states of said other processors; and transferring from said particular processor only so many calls until the load state of said particular processor again falls below said specific value.

* * * * *